(12) United States Patent
Armstrong et al.

(10) Patent No.: US 6,909,964 B2
(45) Date of Patent: Jun. 21, 2005

(54) VEHICLE LOCATING SYSTEM

(75) Inventors: Ray G. Armstrong, Bay City, MI (US); Robert A. Perisho, Jr., Russiaville, IN (US); Curtis N. Kell, Burlington, WI (US)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 10/190,245

(22) Filed: Jul. 3, 2002

(65) Prior Publication Data

US 2004/0006426 A1 Jan. 8, 2004

(51) Int. Cl.[7] .............................................. G06F 19/00
(52) U.S. Cl. ...................... 701/207; 701/223; 342/457; 342/419; 340/5.64; 340/989
(58) Field of Search ................................ 701/223, 213, 701/207, 209, 208, 211; 342/457, 357.07, 442, 449; 455/575.9, 90.2, 550.1; 340/5.64, 5.72, 989, 426, 988, 825.72, 539

(56) References Cited

U.S. PATENT DOCUMENTS

| | | | |
|---|---|---|---|
| 5,043,736 A | | 8/1991 | Darnell et al. ............... 342/457 |
| 5,777,580 A | * | 7/1998 | Janky et al. ................. 342/457 |
| 5,914,675 A | * | 6/1999 | Tognazzini .................. 340/989 |
| 6,129,035 A | | 10/2000 | Schweinberger .......... 116/28 R |
| 6,184,801 B1 | | 2/2001 | Janky .......................... 340/988 |
| 6,246,323 B1 | | 6/2001 | Fischbach ................... 340/539 |
| 6,265,975 B1 | | 7/2001 | Zimmerman ................ 340/571 |
| 6,275,157 B1 | | 8/2001 | Mays et al. .............. 340/572.5 |
| 6,362,599 B1 | | 3/2002 | Turner et al. | |
| 6,405,125 B1 | * | 6/2002 | Ayed .......................... 701/200 |
| 6,571,154 B2 | | 5/2003 | Worrell et al. | |
| 6,590,534 B1 | * | 7/2003 | Kroll et al. ................. 342/442 |
| 2002/0067249 A1 | * | 6/2002 | Johnson et al. ............. 340/426 |
| 2003/0055560 A1 | * | 3/2003 | Phillips ...................... 701/213 |
| 2003/0117293 A1 | * | 6/2003 | Tang et al. ............ 340/825.72 |

OTHER PUBLICATIONS

Where is it? By Tim Moran, Automotive News, Dec. 3, 2001.

* cited by examiner

Primary Examiner—Thomas G. Black
Assistant Examiner—Ronnie Mancho
(74) Attorney, Agent, or Firm—Michael D. Smith

(57) ABSTRACT

A vehicle locating system includes a first transmitter within the vehicle, the first transmitter is configured to transmit a location signal; and a key fob including: a receiver, a direction indicator, and wherein the direction indicator is configured to point towards the first transmitter in response to receipt of the location signal by the receiver. In another embodiment, the vehicle locating system includes a first cellular telephone within the vehicle; a first GPS receiver within the vehicle and in operable communication with the first cellular telephone, the first GPS receiver is configured to determine a location of the vehicle; a hand-held device including: a direction indicator, a second cellular telephone, and a second GPS receiver in operable communication with the second cellular telephone, the second GPS receiver is configured to determine a location of the hand-held device; and wherein the first GPS receiver provides the location of the vehicle to the first cellular telephone, and the direction indicator is configured to point in a direction of the vehicle in response to a comparison of the location of the vehicle and the location of the hand-held device.

20 Claims, 3 Drawing Sheets

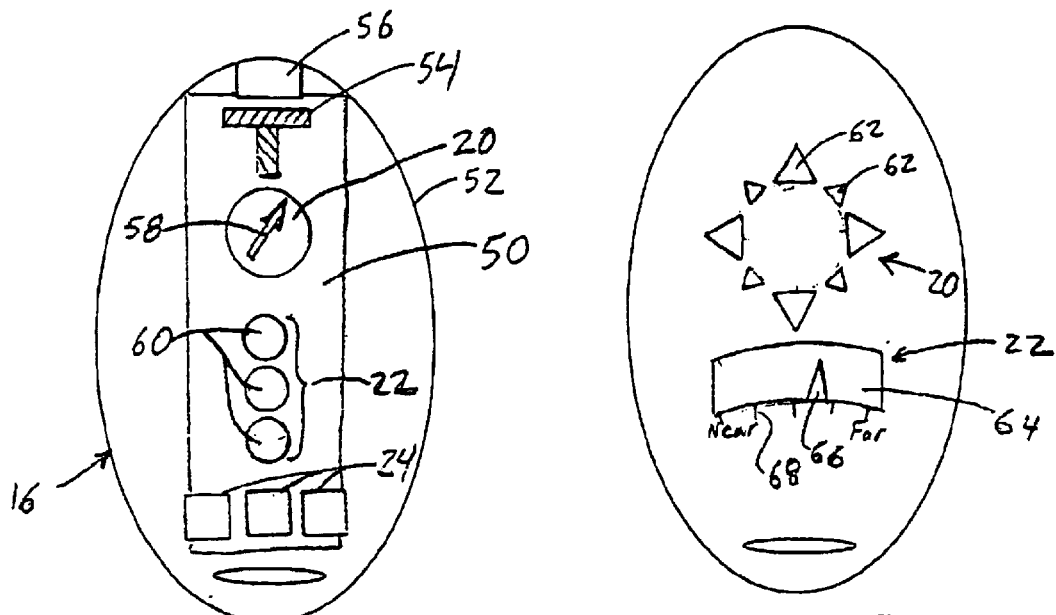
Figure 2
Figure 3
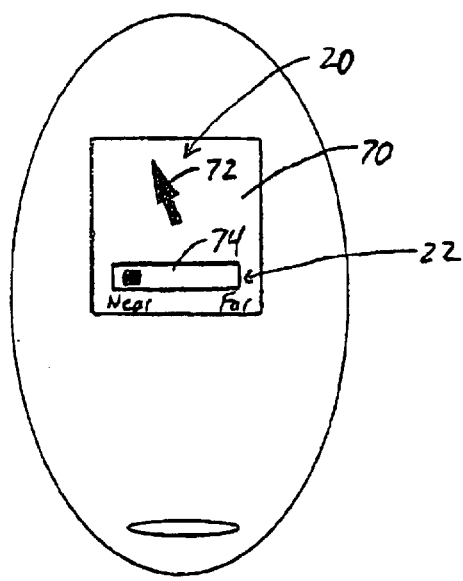
Figure 4

VEHICLE LOCATING SYSTEM

BACKGROUND OF THE INVENTION

Many devices have been designed to help a driver find his or her vehicle. Typically, such devices include a visual indication means that is attached to the car's exterior. Such visual indication means extend above other cars in the lot so that the driver can easily see the location of his or her car.

While visual indication means are effective, they have many drawbacks. For example, such devices rely on visual recognition, which requires that the device be tall enough to allow visibility over tall vehicles. Problematically, when such devices are made to be tall, they are also very bulky and more susceptible to being damaged by the wind. Another drawback of visual indicators is that they must be located on the exterior of the vehicle. Because visual indicators are located on the exterior of the vehicle, they detract from the visual appeal of the car.

BRIEF SUMMARY OF THE INVENTION

Disclosed herein is a vehicle locating system comprising: a first transmitter within the vehicle, the first transmitter configured to transmit a location signal; a hand-held device including a receiver and a direction indicator, the direction indicator is visible on the hand-held device, the direction indicator is configured to point towards the first transmitter in response to transmission of the location signal.

In one embodiment, the vehicle locating system includes a first transmitter within the vehicle, the first transmitter is configured to transmit a location signal; and a key fob including: a receiver, a direction indicator, and wherein the direction indicator is configured to point towards the first transmitter in response to receipt of the location signal by the receiver.

In another embodiment, the vehicle locating system includes a first cellular telephone within the vehicle, the first cellular telephone including a first receiver and a first transmitter; a first GPS receiver within the vehicle and in operable communication with the first cellular telephone, the first GPS receiver is configured to determine a location of the vehicle; a hand-held device including: a direction indicator, a second cellular telephone, the second cellular telephone including a second receiver and a second transmitter, and a second GPS receiver in operable communication with the second cellular telephone, the second GPS receiver is configured to determine a location of the hand-held device; and wherein the first GPS receiver provides the location of the vehicle to the first cellular telephone, and the direction indicator is configured to point in a direction of the vehicle in response to a comparison of the location of the vehicle and the location of the hand-held device.

BRIEF DESCRIPTION OF THE DRAWINGS

Referring now to the figures, wherein the like elements are numbered alike:

FIG. 2 is a schematic view of a direction and proximity indicating key fob of the vehicle locating system of FIG. 1;

FIG. 3 is a top view of an alternative embodiment of the direction and proximity indicating key fob of FIG. 2;

FIG. 4 is a top view of another alternative embodiment of the direction and proximity indicating key fob of FIG. 2.

DETAILED DESCRIPTION OF A PREFERRED EMBODIMENT

Figure 1:
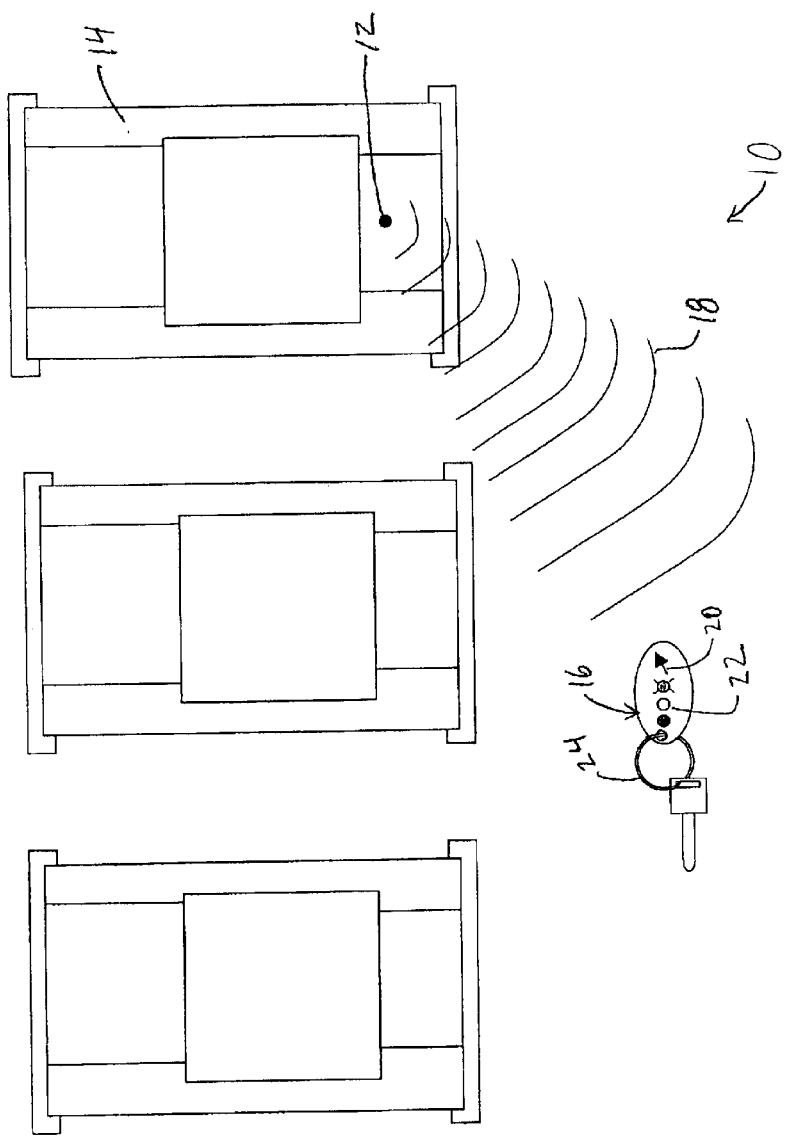
FIG. 1 is a schematic view of a vehicle locating system indicating a direction and a proximity of a vehicle.

Referring to FIG. 1, a vehicle locating system is shown generally at 10. Vehicle locating system 10 includes a transmitter 12 coupled to a vehicle 14, and a hand-held device 16 configured to receive a location signal 18 transmitted by transmitter 12. Visible on the hand-held device 16 is a direction indicator 20 and a proximity indicator 22. Direction indicator 20 points in the direction of transmitter 12, which is the source of signal 18. A person holding the hand-held device 16 can determine the direction of vehicle 14 by viewing direction indicator 20. Proximity indicator 22 indicates the intensity of the direction signal 18 received at the hand-held device 16. A person holding the hand-held device 16 can approximate a distance between the vehicle 14 and the hand-held device 16 by viewing proximity indicator 20. In the embodiment of FIG. 1, hand-held device 16 is a key fob. Disposed on the key fob is a key retaining device 24. Key retaining device 24 may include, for example, one or more of a ring, chain, lanyard, and the like. While vehicle 14 is shown here as an automobile, it will be recognized that vehicle 14 may include any mobile platform such as trucks, motorcycles, boats, etc.

Transmitter 12 may be any device that transmits ultrasonic or radio frequency (RF) electromagnetic waves with identity information encoded as, for example, amplitude modulation, frequency modulation, pulse width modulation, or the like. The transmitter 12 may operate using ultrasonic frequencies, spread spectrum, the family of radio frequencies at the 400–500 megahertz range, the cell and page frequencies at 900 megahertz or higher frequencies. Alternatively, transmitter 12 is any device that transmits light with identity information encoded as pulse width modulation, or the like. Preferably, the identity information and frequency mode of operation is programmable to provide a unique identity for each vehicle 14 and to operate at any number of frequencies.

Referring to FIG. 2, a schematic view of the internal features of hand-held device 16 is shown. Hand-held device 16 includes control circuitry 50 mounted within a housing 52. Also mounted within housing 52 are: a directional receiver 54, a transmitter 56, directional indicator 20, proximity indicator 22, and various control buttons 24. Directional receiver 54, transmitter 56, directional indicator 20, proximity indicator 22, and various control buttons 24 are all electrically coupled to control circuitry 50. Control circuitry 50 may include any one or more of: a microprocessor, a printed circuit, an application-specific integrated circuit, and the like. Directional receiver 54 may include any device configured to receive RF or light signals and convert these signals into one or more signals indicating a direction of the signal source and, optionally, the frequency, amplitude, or pulse modulation of the received signal. For example, directional receiver 54 may include one or more of: a directional antenna and an array of light receiving elements. Transmitter 56 may include, for example, an infra-red light transmitter or a RF transmitter. Directional indicator 20 may include any number of different designs to provide indication of direction relative to the hand-held device 16. Proximity indicator 22 may include any number of different designs to provide indication of the strength of the location signal 18 received at the hand-held device 16. In the embodiment shown in FIG. 2, directional indicator 20 includes an analog indicator dial in which an arrow 58 is rotated to provide indication of direction. It will be recognized that control circuitry 50, directional receiver 54, and directional indicator 20 may be part of an Automatic Direction Finder (ADF) system. In the embodiment shown in FIG. 2, proximity indicator 22 includes a plurality of light emitting diodes (LEDs) 60 arranged in graduated fashion, wherein individual LEDs 60 are illuminated to provide indication of signal strength. Control buttons 24 may include buttons typically found in key fobs, such as: a door lock button, a door unlock button, and an alarm button. Optionally, control buttons 24 may include a transmitter activation button, which can be pressed to send a signal via transmitter 56 to vehicle 14 causing vehicle 14 to activate transmitter 12.

Various alternative embodiments for the directional indicator 20 and proximity indicator 22 are shown in FIGS. 3–4. FIG. 3 shows directional indicator 20 including a plurality of LEDs 62 arranged in compass rose fashion, wherein individual LEDs 62 are illuminated to provide indication of direction. Proximity indicator 22 in FIG. 3 includes an analog gage 64 in which an arrow 66 points to a scale 68 to indicate signal strength. FIG. 4 shows directional indicator 20 including a liquid crystal diode (LCD) screen 70 displaying an arrow 72 to provide indication of direction. FIG. 4 also shows proximity indicator 22 as a display 74 on LCD screen 70 to provide indication of signal strength. It will be recognized that the various combinations of directional indicator 20 and proximity indicator 22 in FIGS. 2–4 are shown for example only, and that different combinations or embodiments may be used.

Referring again to FIGS. 1 and 2, operation of vehicle locating system 10 can be described as follows. Transmitter 12 transmits a location signal 18 as RF or light waves with identity information encoded as amplitude modulation, frequency modulation, pulse width modulation, or the like. Transmitter 12 may transmit location signal 18 continuously or intermittently (e.g., about once every minute). Directional receiver 54 receives the location signal 18 directly from transmitter 12 and provides to the control circuitry 50 one or more electrical signals indicating: the encoded identity information, the intensity of the location signal received, and the direction of the location signal 18 source. Control circuitry 50 decodes the identity information from these signals to determine if the location signal 18 originated from transmitter 12 or from another source. If the identity information indicates that the location signal 18 originated at transmitter 12, the control circuitry 50 provides an output signal to directional indicator 20, which visually indicates the direction of transmitter 12. In addition, if the identity information indicates that the location signal 18 originated at transmitter 12, control circuitry 50 provides an output signal indicating signal intensity to proximity indicator 22, which, in turn, visually indicates the intensity of the location signal 18 received at hand held device 16. From the visual indications of the direction and signal intensity, a person holding the hand-held device 16 can determine the direction of the vehicle 14 and can approximate a distance between the vehicle 14 and the hand-held device 16. Thus, the hand-held device 16 will assist the person in finding the vehicle 14.

Figure 5:
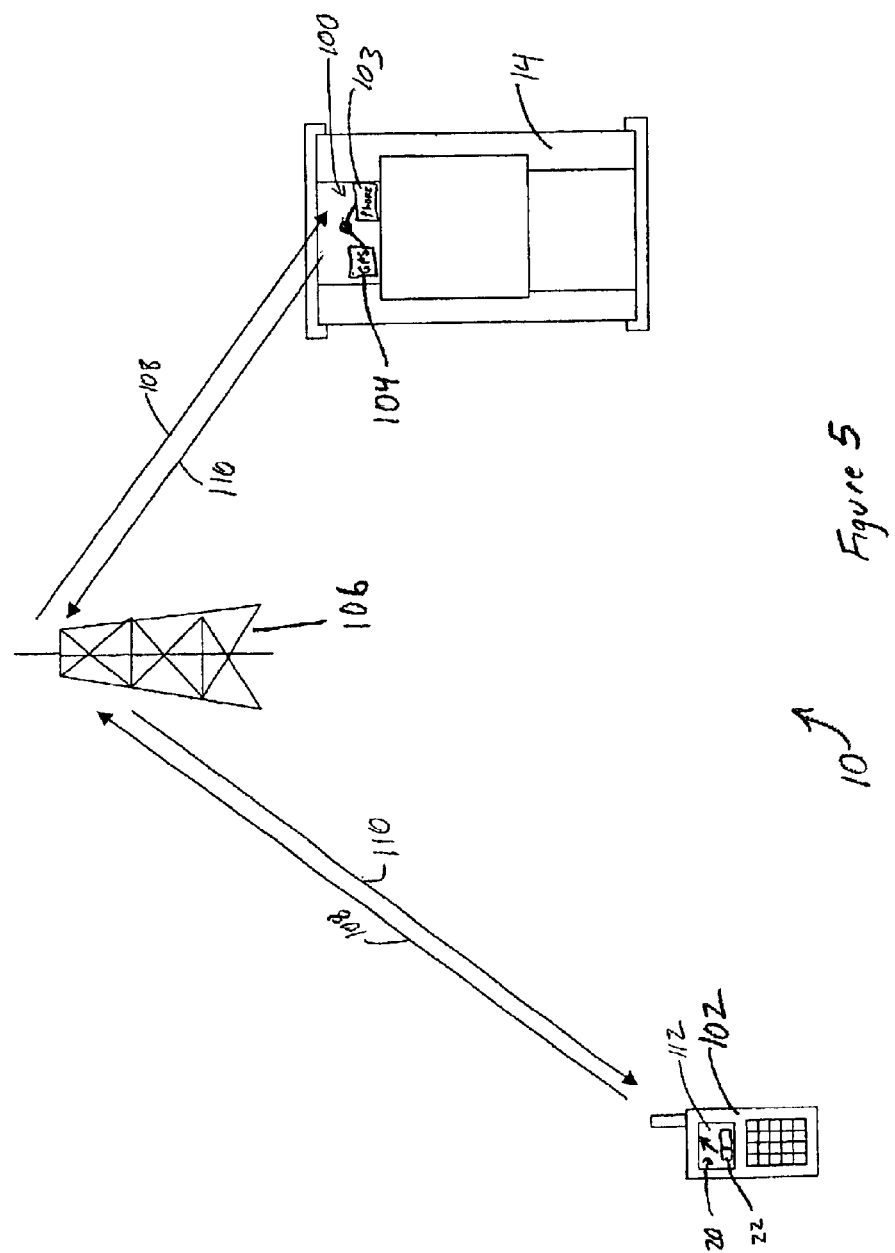
FIG. 5 is an alternative embodiment of the vehicle locating system.

Referring to FIG. 5, an alternative embodiment of vehicle locating system 10 is shown. In this embodiment, vehicle locating system 10 includes a transmitter/receiver system 100 coupled to vehicle 14, and a hand-held device 102. Transmitter/receiver system 100 may be any device or group of devices that transmits and receives radio frequency (RF) electromagnetic waves with information encoded as amplitude modulation, frequency modulation, pulse width modulation, or the like. Transmitter/receiver system 100 includes a cellular telephone 103 configured to receive vehicle 14 location information from a global positioning system (GPS) receiver 104 mounted in vehicle 14. Transmitter/receiver system 100 may be part of a system with cellular telephone and GPS capability, such as that commercially available from General Motors® as the OnStar® system. Hand-held device 102 includes a cellular telephone with a GPS receiver. Visible on the hand-held device 102 is direction indicator 20 and proximity indicator 22.

In operation, a user of the hand-held device 102 calls transmitter/receiver system 100 by way of a standard cellular telephone network 106 and provides an activation signal 108 to transmitter/receiver system 100 through this connection. Upon receiving the activation signal 108, transmitter/receiver system 100 accesses location information for vehicle 14 from GPS receiver 104 and transmits a location signal 110 containing the location information to hand held device 102 via cellular telephone 103 and network 106. The hand held device 102 compares this location information with the current location of the hand-held device 102, as determined by the GPS receiver within hand held device 102, to determine the location of vehicle 14 relative to hand held device 102 and provides visual indication of the direction and distance of vehicle 14 using direction indicator 20 and proximity indicator 22. Direction indicator 20, which may include an arrow to indicate direction, and proximity indicator 22 are visible on a LCD screen 112 secured to hand held device 102. Using direction indicator 20 and proximity indicator 22, a person holding hand held device 102 can determine the location of vehicle 14.

In an alternative embodiment, the user of the hand held device 102 is able to control actions of transmitter/receiver system 100 by selecting from various options presented on LCD screen 110 of hand held device 102. In this embodiment, a user of the hand held device 102 selects from these options, and, in response, hand held device 102 provides a signal indicating the selected option to transmitter/receiver system 100 via the cellular telephone network 106. One of the options available for selection would be to "Find Vehicle", which would prompt transmitter/receiver system 100 to accesses location information for vehicle 14 from GPS receiver 104 and transmit the location information to hand held device 102. Hand held device 102 then processes the location information to indicate the direction of vehicle 14, as previously discussed.

Vehicle locating system 10 allows a vehicle to be found quickly, with a hand held device to guide the user to the vehicle. Unlike vehicle locating devices of the prior art, vehicle locating system 10 does not rely on visual means attached to the vehicle. As a result, vehicle locating system 10 can be added to a vehicle without bulky and unsightly additions to the exterior of the vehicle. In addition, vehicle locating system 10 allows a vehicle to be located over greater distances than that possible with the prior art.

What is claimed is:

1. A vehicle locating system comprising:
    a first transmitter within the vehicle, said first transmitter configured to transmit a location signal;
    a hand-held device including a receiver and a direction indicator, said direction indicator is visible on said hand-held device, said direction indicator is configured to point towards said first transmitter in response to transmission of said location signal.

2. The vehicle locating system of claim 1, wherein said receiver is a directional receiver and said location signal is received by said directional receiver.

3. The vehicle locating system of claim 2, wherein said hand-held device further includes:
- a proximity indicator visible on said hand-held device, said proximity indicator indicates an intensity of said location signal received by said hand-held receiver.

4. The vehicle locating system of claim 2, wherein said hand-held device further includes:
- one or more control buttons; and
- a second transmitter configured to transmit a control signal to the vehicle in response to the selection of said one or more control buttons.

5. The vehicle locating system of claim 4, wherein one of said one or more control buttons is a transmitter activation button, and wherein said first transmitter transmits said location signal in response to selection of said transmitter activation button.

6. The vehicle locating system of claim 2, wherein said location signal is an electromagnetic wave encoded with identity information, said identity information uniquely identifies the vehicle.

7. The vehicle locating system of claim 2, wherein said location signal is a light signal.

8. The vehicle locating system of claim 2, wherein said hand-held device is a key fob.

9. The vehicle locating system of claim 1, wherein said location signal is provided to said hand-held device via a cellular telephone network.

10. The vehicle locating system of claim 9, wherein said location signal is encoded with a location of the vehicle, and said hand-held device is configured to compare said location of the vehicle with a location of said hand-held device and point said direction indicator toward the vehicle in response to said comparison.

11. The vehicle locating system of claim 10, further including:
- a first cellular telephone within the vehicle, said first cellular telephone including a first receiver and said first transmitter;
- a first GPS receiver within the vehicle and in operable communication with said first cellular telephone;
- a second cellular telephone within said hand-held device, said second cellular telephone including said second receiver and a second transmitter;
- a second GPS receiver in operable communication with said second cellular telephone; and
- wherein said first GPS receiver determines said location of the vehicle, and said second GPS receiver determines said location of said hand held device.

12. The vehicle locating system of claim 10, wherein said hand-held device is configured to display one or more selectable options, and said first transmitter transmits said location signal in response to selection of one of said selectable options.

13. The vehicle locating system of claim 10, wherein said first transmitter transmits said location signal in response to receiving an activation signal from said hand-held device.

14. The vehicle locating system of claim 10, further comprising:
- a proximity indicator visible on said hand-held device, said proximity indicator indicates a distance between the vehicle and the hand-held device in response to said comparison.

15. A vehicle locating system comprising:
- a first transmitter within the vehicle, said first transmitter is configured to transmit a location signal;
- a key fob including:
  - a receiver,
  - a direction indicator, and
  - wherein said direction indicator is configured to point towards said first transmitter in response to receipt of said location signal by said receiver.

16. The vehicle locating system of claim 15, wherein said hand-held device further includes:
- a proximity indicator visible on said key fob, said proximity indicator indicates an intensity of said location signal received by said receiver.

17. The vehicle locating system of claim 15, wherein said key fob further includes:
- one or more control buttons; and
- a second transmitter configured to transmit a control signal to the vehicle in response to the selection of said one or more control buttons.

18. The vehicle locating system of claim 17, wherein one of said one or more control buttons is a transmitter activation button, and wherein said first transmitter transmits said location signal in response to selection of said transmitter activation button.

19. The vehicle locating system of claim 15, wherein said location signal is an electromagnetic wave encoded with identity information, said identity information uniquely identifies the vehicle.

20. The vehicle locating system of claim 15, wherein said location signal is a light signal.

* * * * *